Sept. 19, 1961 C. E. EVES ET AL 3,000,213
FLUID TESTING PROBE
Filed Aug. 8, 1955
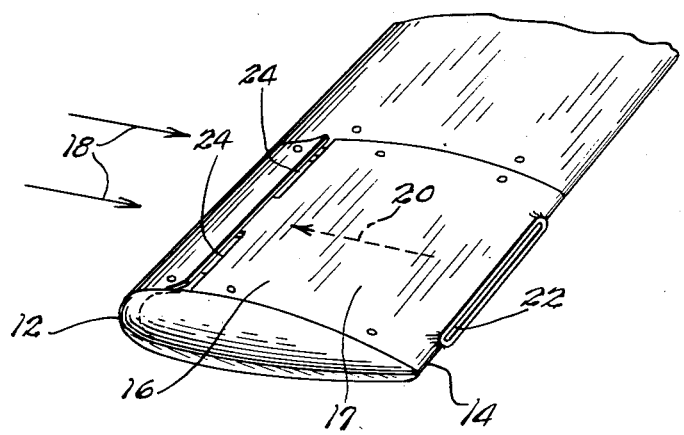
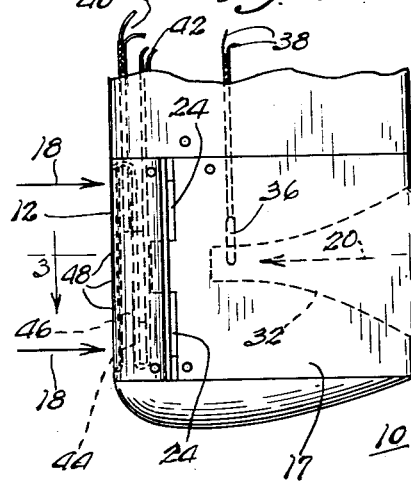
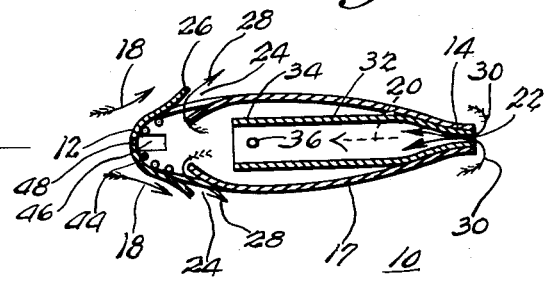
INVENTORS.
Charles E. Eves &
BY Edward J. Tschupp.

United States Patent Office 3,000,213
Patented Sept. 19, 1961

3,000,213
FLUID TESTING PROBE
Charles E. Eves, Wood Dale, and Edward J. Tschupp, Libertyville, Ill., assignors, by mesne assignments, to Cook Electric Company, Chicago, Ill., a corporation of Delaware
Filed Aug. 8, 1955, Ser. No. 526,972
5 Claims. (Cl. 73—349)

This invention relates to an improved fluid testing probe and more particularly to an improved device for measuring the temperature of air passing over the probe at relatively high speeds. The formation of ice on airfoils and aircraft surfaces poses a continuing problem to the airlines and armed services in that the phenomenon of ice formation is little understood or correlated to other physical phenomena and has not been adequately studied to date. Icing on aircraft surfaces is dependent upon many factors, although the primary ones appear to be the amount of moisture in the air and the temperature of the air. Altitude, air motion, and other factors, however, contribute in an important manner to the overall phenomenon.

In order to better understand icing phenomena, to accumulate data for additional icing studies, and for other meteorological and navigational purposes, it is necessary to determine the temperature of the air surrounding an aircraft in flight whereby a comparison may be made between the physical characteristics of the air while excluding the effects of flying conditions. It is difficult in high speed flight to determine accurately the temperature of surrounding air, as it is necessary to first isolate all external effects such as the motion of the temperature probe through the air, the impact effects of the air on the probe, the effects of moisture and evaporation in the area surrounding the probe, and any variables in the recovery factor or ventilation of the probe.

It is therefore one important object of this invention to provide an improved temperature probe capable of accurate determination of the ambient temperature of the air surrounding a moving aircraft.

It is a further object of this invention to provide an improved temperature probe capable of isolating the effects of ice and moisture during use.

It is another object of this invention to provide an improved temperature probe having a sensing element isolated from the ice and moisture of the atmosphere while having a high ventilation rate.

It is still a further object of this invention to provide an improved temperature probe having a substantially linear recovery factor whereby the results of measurements therewith may be accurately calibrated and corrected and consistently repeated.

It is still another object of this invention to provide an improved temperature probe including automatic de-icing means which does not adversely affect the temperature data being accumulated.

It is a further object of this invention to provide an improved temperature probe capable of concurrently and automatically accumulating data on the ambient temperature and the icing rate.

Further and additional objects of this invention will become obvious from a consideration of this specification, the accompanying drawing and the appended claims.

In one form of this invention a short piece of streamlined tubing is provided with a narrow elongated opening parallel to the axis thereof and disposed at a position along the airfoil surface where the fluid velocity will be at a maximum and is further provided with slot means along the rearwardmost edge of the tubing. A temperature responsive element is positioned within the tubing for measuring the temperature of the air passing through the opening at the rearmost edge of the tubing to the other opening. The air is channeled past the temperature responsive element by a sleeve means or air guide. Furthermore, means is provided by this invention for sensing the accumulation of ice on the probe and for removal of such ice therefrom.

For a more complete understanding of this invention reference will now be made to the accompanying drawing wherein:

FIGURE 1 is a perspective view of one embodiment of this invention;

FIG. 2 is a side elevational view of the embodiment of FIG. 1; and

FIG. 3 is a transverse sectional view of the embodiment of FIG. 2 taken on the line 3—3 thereof.

Referring now to the drawings and more particularly to FIG. 1, an air probe 10 is illustrated having a conventional streamlined, generally teardrop cross section including a leading edge 12, a trailing edge 14, and an intermediate bulbous portion 16. The probe 10 will be moved in such a manner that air will pass over the surfaces thereof in the direction indicated by arrows 18. As is well known from physical principles, the air will, in passing over the surfaces of the probe 10, have a maximum velocity at some point along the bulbous portion 16. The point of maximum velocity, of course, is dependent on the configuration of the probe. According to this invention it is desirable to perform temperature measurements on air which is completely free of ice and moisture. In order to accomplish this, the air which is normally moving in the direction indicated by arrows 18 is reversed and passed through the internal portion of the probe 10 in the direction indicated by broken arrows 20. Thus, the air moving over the probe in the direction indicated by arrows 18 reverses its direction and is drawn inwardly through the elongate slot 22 formed in the trailing edge 14 of the probe 10.

It is important that the narrow elongated opening 22 be very long relative to its transverse dimension to provide complete centrifuging of the air, causing only clean dry air to enter the probe 10, all moisture or ice having been forced by inertia to continue rearwardly in the direction indicated by arrows 18. It will, of course, be clear that either the air or the probe 10 may be in motion, the only requirement being that the relative motion of the air and probe be as indicated in the drawing and description. To cause air to move through the probe in the direction indicated by broken arrow 20, a narrow elongated aspirator opening 24 is provided on each side of the bulbous portion 16 of probe cover 17. Air passing over these opening at high speeds produces substantially reduced pressures in accordance with Bernoulli's principles. Thus, the air is withdrawn from the openings 24, causing the inverse motion through the center of the probe indicated by arrow 20.

Referring to FIG. 3, the motion of the air is more clearly shown. The air moving along the path indicated by arrows 18 flows over the slightly flared portion 26 of the leading edge 12 of probe cover 17, causing reduced pressure at the openings 24 and producing the air motion indicated by arrows 28. This forces air sharply about the trailing edge 14 into the opening 22 as indicated by arrows 30 and the sharp reversal of air motion causes the centrifuging action described above. An air guide or passageway is defined within the probe 10 by a sleeve 32 which has a temperature responsive element 36 positioned in a portion of minimum cross-section. The temperature responsive element 36 may be of any conventional type capable of producing electrical variations proportional to temperature variations. It has been found that the air impinging upon temperature probe 36 is completely free of ice and moisture and thus may be accurately measured and utilized in meteorological determinations. A ventilation rate of air through the passageway 32 is approximately two-thirds of that on the outside surfaces of the probe 10. That is, if air is impinging against a leading edge of the probe 10, traveling at approximately 300 miles per hour, the internal reverse air motion within the passageway 32 is at approximately 200 miles per hour. It has also been found that the effects of impact and air motion upon the air temperature indication in this device adhere very closely to the theoretical value. The relationship between the actual and theoretical values of adiabatic temperature increase is defined as "recovery factor" and this is found to be substantially constant over an extremely wide range of air speeds in the described device and has a value of approximately 65%.

The temperature probe is connected to indicating instruments in the aircraft through a pair of electrical conductors 38, and additional electrical conductors 40 and 42 are also provided through the probe for the purpose to be described. The conductors 42 are connected to a heating element 44 disposed immediately behind the leading edge 12 of the probe cover 17. It may be necessary when this device is in use to apply heat to the leading edge of the probe to reduce the formation of ice thereon and maintain the openings 24 in an open and fully functional condition.

It has been found that the temperature indications at probe 36 are completely unaffected by the heating of the leading edge 12. The heater 44 is not energized continuously, but is energized only when ice is present on the leading edge 12. Means is provided for sensing the presence of ice on the probe 10. A small pressure sensitive switch 46 is secured behind the leading edge 12 and a plurality of apertures 48 formed in the leading edge provide access of air to the switch 46. Air entering the apertures 48 is under the impact pressure resulting from the relative motion of the air and probe and this pressure is sufficient to maintain the switch 46 in such a position that the heating element 44 is deenergized. Upon formation of ice on the leading edge 12 the apertures 48 become blocked and the pressure on switch 46 is thus relieved. This produces completion of the heating circuit through conductors 42 and heating element 44 to melt the ice and once again open the apertures 48 for subsequent testing. The conductors 40 are connected to the switch 46 and are normally connected to the heater control system including a normally energized relay.

It is advantageous to accurately accumulate information for meterological purposed indicating the icing rate in the atmosphere under known conditions of temperature. Thus, by making a record of the number of energizations and the periodicity of energization of the heater circuit, an actual indication is available of the icing rate or icing tendency in the atmosphere under all conditions. This information is of great value in improving the safety and reliability of air travel.

While one particular embodiment has been described herein many variations will occur to one skilled in this art. To provide a satisfactory probe of the type described herein it is only necessary to so proportion the various components that the air is recycled forwardly through the air passageway at a rapid rate in a condition completely free of ice and moisture. This is accomplished by a centrifuging action at the trailing edge of the probe and this centrifuging action is insured by the tear-drop formation and the provision of a long thin intake opening 22 facing rearwardly along the trailing edge of the probe. Other advantages such as the icing rate data and freedom of the data from the influence of the heating element may manifestly be gained in devices employing the basic teaching of this invention although departing from the particular embodiment herein described.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:
1. A probe for determining the characteristics of a fluid medium moving relative thereto comprising a body having a leading edge, a trailing edge and an intermediate bulbous portion, said body having a first narrow elongated opening in said bulbous portion substantially normal to the direction of said relative motion; a second narrow elongated opening in said trailing edge substantially parallel to said first opening; a fluid guide within said body having two openings and a minimum cross-sectional area, one opening of said guide communicating with said first opening and the other opening spaced from said body and said second opening; and a temperature sensitive device disposed in said fluid guide at said minimum cross-section.

2. A probe for determining the characteristics of a fluid medium moving relative thereto comprising a body having a leading edge, a trailing edge and an intermediate bulbous portion, said body having a first narrow elongated opening oriented substantially normal to the direction of said relative motion, said first opening being disposed in said bulbous portion of said body at the point where said fluid medium has substantially maximum velocity; a second narrow elongated opening in said trailing edge substantially parallel to said first opening; a fluid guide within said body having two openings and a minimum cross-sectional area, one opening of said guide communicating with said second opening and the other opening spaced from said body and said first opening; and a temperature sensitive device disposed in said fluid guide at said minimum cross-section.

3. A probe for determining the characteristics of a fluid medium moving relative thereto comprising a body having a leading edge, a trailing edge and an intermediate bulbous portion, said body having a first narrow elongated opening in said bulbous portion substantially normal to the direction of said relative motion; a second narrow elongated opening in said trailing edge substantially parallel to said first opening; sleeve means within said body positioned between said first and second openings to guide the fluid passing through said second opening toward said first opening, said sleeve means having an end portion disposed in spaced relationship from said body and said second opening, said sleeve means having a minimum cross-sectional area; and a temperature sensitive device disposed in said fluid guide at said minimum cross-section.

4. A probe for determining the characteristics of a fluid medium moving relative thereto comprising a body having a leading edge, a trailing edge and an intermediate bulbous portion, said body having a first narrow elongated opening in said bulbous portion substantially normal to the direction of said relative motion; a second narrow elongated opening in said trailing edge substantially parallel to said first opening; a fluid guide within said body having two openings and a minimum cross-sectional area, one opening of said guide communicating with said first opening and the other opening spaced from said body and said second opening; a temperature sensitive device disposed in said fluid guide at said minimum cross-section; means for removing ice forming along said leading edge; and means responsive to the formation of ice along said leading edge for controlling said ice removing means.

5. A probe for determining the characteristics of a fluid medium moving relative thereto comprising a body having a leading edge, a trailing edge and an intermediate bulbous portion, said body having a number of small apertures along said leading edge, and a first narrow elongated opening in said bulbous portion substantially normal to the direction of said relative motion; a second narrow elongated opening in said trailing edge substantially parallel to said first opening; a fluid guide within said body having two openings and a minimum cross-sectional area, one opening of said guide communicating with said first opening and the other opening spaced from said body and said second opening; a temperature sensitive device disposed in said fluid guide at said minimum cross-section; a heater disposed in said body adjacent said leading edge; and pressure-sensitive means responsive to fluid pressure through said apertures in said leading edge to control said heater.

References Cited in the file of this patent

UNITED STATES PATENTS

| | | |
|---|---|---|
| 2,182,547 | Tumey | Dec. 5, 1939 |
| 2,536,037 | Clousing et al. | Jan. 2, 1951 |
| 2,680,583 | Davis | June 8, 1954 |
| 2,775,679 | Flubacker | Dec. 25, 1956 |
| 2,931,227 | Werner et al. | Apr. 5, 1960 |

FOREIGN PATENTS

| | | |
|---|---|---|
| 364,233 | Germany | Nov. 18, 1922 |
| 626,543 | Great Britain | July 18, 1949 |
| 674,750 | Great Britain | July 2, 1952 |